(12) United States Patent
Zaniker et al.

(10) Patent No.: US 9,936,804 B2
(45) Date of Patent: *Apr. 10, 2018

(54) SYSTEM AND METHOD FOR RETROFITTING COIN-OPERATED LOCKERS

(71) Applicant: Best Lockers, LLC, Orlando, FL (US)

(72) Inventors: John Zaniker, Severna Park, MD (US); Dennis Toibero, Laurel, MD (US); Scott Nelson, Apopka, FL (US)

(73) Assignee: Best Lockers, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,150

(22) Filed: Oct. 23, 2017

(65) Prior Publication Data

US 2018/0042376 A1    Feb. 15, 2018

Related U.S. Application Data

(63) Continuation of application No. 14/257,810, filed on Apr. 21, 2014, now Pat. No. 9,795,214.

(Continued)

(51) Int. Cl.
*G07F 7/10*       (2006.01)
*A47B 81/00*    (2006.01)
*A47B 96/00*    (2006.01)
*E05B 3/00*      (2006.01)
*E05B 49/00*    (2006.01)

(Continued)

(52) U.S. Cl.
CPC .............. *A47B 47/00* (2013.01); *A47B 81/00* (2013.01); *A47B 96/00* (2013.01); *G06Q 20/18* (2013.01); *G06Q 20/3274* (2013.01); *G06Q 20/3278* (2013.01); *G06Q 20/342* (2013.01); *G06Q 20/347* (2013.01); *G06Q 20/352* (2013.01); *G06Q 20/4012* (2013.01); *G06Q 20/40145* (2013.01); *G06Q 30/0645* (2013.01); *G07F 5/26* (2013.01); *G07F 7/04* (2013.01); *G07F 7/10* (2013.01); *G07F 17/12* (2013.01)

(58) Field of Classification Search
CPC ........................................................ G06F 7/04
See application file for complete search history.

(56) References Cited

U.S. PATENT DOCUMENTS

4,333,556 A    6/1982   Robbins
5,223,829 A    6/1993   Watabe
(Continued)

*Primary Examiner* — Joseph Feild
*Assistant Examiner* — Pameshanand Mahase
(74) *Attorney, Agent, or Firm* — Dentons US LLP (57) ABSTRACT

A method of manufacturing an electromechanical locker system may include providing a set of lockers with coin-operated locks. The coin-operated locks may be removed from the set of lockers. A conduit may be extended along and connected to a frame member from which the coin-operated locks had previously been positioned. Electromechanical lock units may be attached to the conduit so as to replace the coin-operated locks. A retrofitted coin-operated locker bank may include a coin-operated locker bank including a multiple lockers having respective doors, where the coin-operated locker bank is free of coin-operated locks. A conduit may be connected to a frame member and extend vertically adjacent to the hinged doors of a column of lockers. Multiple electromechanical lock units may be attached to the conduit so as to replace the coin-operated locks.

20 Claims, 8 Drawing Sheets

Related U.S. Application Data

(60) Provisional application No. 61/814,105, filed on Apr. 19, 2013.

(51) Int. Cl.
| | |
|---|---|
| *E05B 51/00* | (2006.01) |
| *A47B 47/00* | (2006.01) |
| *G06Q 20/18* | (2012.01) |
| *G06Q 20/32* | (2012.01) |
| *G06Q 20/34* | (2012.01) |
| *G06Q 20/40* | (2012.01) |
| *G06Q 30/06* | (2012.01) |
| *G07F 5/26* | (2006.01) |
| *G07F 7/04* | (2006.01) |
| *G07F 17/12* | (2006.01) |

(56) References Cited

U.S. PATENT DOCUMENTS

| | | |
|---|---|---|
| 5,894,277 A | 4/1999 | Keskin et al. |
| 2005/0179517 A1 | 8/2005 | Harms et al. |
| 2007/0277571 A1* | 12/2007 | Gokcebay ........ G07C 9/00666 70/278.1 |
| 2008/0252083 A1* | 10/2008 | Carabalona ............. E05B 81/14 292/49 |
| 2009/0193859 A1* | 8/2009 | Kwon .................. E05B 47/026 70/91 |
| 2013/0166060 A1 | 6/2013 | Irwin et al. |
| 2013/0199094 A1 | 8/2013 | Lachance et al. |
| 2014/0109634 A1* | 4/2014 | Almomani ......... G07C 9/00309 70/280 |

\* cited by examiner

FIG. 8

SYSTEM AND METHOD FOR RETROFITTING COIN-OPERATED LOCKERS

RELATED APPLICATIONS

This Application is a continuation of U.S. application Ser. No. 14/257,810 filed Apr. 21, 2014, which claims priority to U.S. Provisional Patent Application Ser. No. 61/814,105 entitled "SYSTEM AND METHOD FOR RETROFITTING COIN-OPERATED LOCKERS" filed Apr. 19, 2013; the entire contents of which are hereby incorporated herein in their entirety.

BACKGROUND

Lockers for rental have traditionally been configured to enable people to deposit coins, such as quarters, into the locks, which have traditionally been mechanical, coin-operated locks. Upon the locks receiving certain monetary value, a person can turn a key from an unlocked position to a locked position with a door of a locker being rented in a closed position, and, upon being turned to the locked position, the key can be withdrawn from the lock. The person can later access the locker by inserting the key back into the lock and turning the key back to the unlocked position.

While the coin-operated locks provide a certain level of convenience for users, the coin-operated locks have limitations. For example, society has been transitioning from a cash-based payment society to a card-based payment society. Thus, people are now as much or more comfortable with using credit cards, debit cards, or prepaid cards as they are using cash, and often do not carry cash, especially to entertainment and activity venues, such as amusement parks and ski slopes, where coin-operated lockers are generally located. Another problem that exists with coin-operated lockers is that people can lose the key and be inconvenienced when needing to access the locker. Of course, in the event of a lost key, the locker owner is inconvenienced and costs result by having to replace the lost keys.

Because the lockers are expensive to replace, owners of the coin-operated lockers tend to not replace the coin-operated lockers despite their shortcomings, as described above. These lockers are generally durable and formed of stainless steel, so last for many years for both the locker owner and facility owner, which, in some cases, are one and the same.

SUMMARY

Because coin-operated lockers are expensive and durable, but have shortcomings in their functional operation, the principles of the present invention provide for retrofitting coin-operated lockers by replacing original mechanical, coin-operated locks with electromechanical lock units that may be configured to operate on a communications network on which one or more kiosks may also operate. In retrofitting the lockers, a conduit may be connected to a frame of the lockers adjacent a side of locker doors on which the mechanical, coin-operated locks are positioned. The conduit provides a protected and concealed space through which electrical conductors, such as power and/or databus wiring, may be passed and connected to the electromechanical lock units. In one embodiment, the conduit along with supporting hardware may be adapted to enable an operator retrofitting the coin-operated lockers to configure the electromechanical locks onto the lockers without having to drill into or otherwise alter the frame or other hardware of the lockers to secure the conduit(s) and electromechanical lock units to the lockers. As a result of the configuration of the retrofit hardware, the ability to disassemble the hardware to gain access to the contents of the lockers is significantly limited. The electromechanical lock units may include an intelligent portion inclusive of logic circuitry, such as a computer processor and communications circuitry, and an electromechanical portion that provides for physical locking functionality.

An embodiment of a method of manufacturing an electromechanical locker system may include providing a set of lockers including a plurality of lockers vertically aligned with one another, where the lockers may include coin-operated locks and a first conduit configured to enable coins to traverse vertically from coin payment slots associated with the vertically aligned coin-operated lockers. The coin-operated locks may be detached from the first conduit of the set of lockers. Multiple first portions of electromechanical lock units may be attached onto a second conduit. The second conduit may be connected to a frame member at which the coin-operated locks had previously been positioned. The second conduit may be positioned adjacent to and in front of the first conduit. Multiple second portions of the electromagnetic lock units may be attached to doors of the vertically aligned lockers, where the first and second portions of the electromechanical lock units may be aligned with one another when the second conduit is attached to the frame member.

An embodiment of a retrofitted coin-operated locker bank may include a coin-operated locker bank including multiple vertically aligned lockers having respective hinged doors, where the coin-operated locker bank is free of coin-operated locks. A first conduit may be configured to enable coins to traverse vertically from previously positioned coin payment slots associated with the previously positioned coin-operated locks. A second conduit may be connected to a frame member, where the second conduit may extend vertically and be (i) adjacent to the hinged doors of the vertically aligned lockers and (ii) adjacent to and in front of the first conduit. Multiple first portions of electromechanical lock units may be affixed to the second conduit. Multiple second portions of electromechanical lock units may be attached to the hinged doors of the vertically aligned lockers.

One embodiment of a method of manufacturing an electromechanical locker system may include providing a set of lockers with coin-operated locks. The coin-operated locks may be removed from the set of lockers. A conduit may be extended along and connected to a frame member from which the coin-operated locks had previously been positioned. Electromechanical lock units may be attached to the conduit so as to replace the coin-operated locks.

One embodiment of a retrofitted coin-operated locker bank may include a coin-operated locker bank including multiple lockers having respective doors, where the coin-operated locker bank is free of coin-operated locks. A conduit may be connected to a frame member and extended vertically adjacent to the hinged doors of a column of lockers. Multiple electromechanical lock units may be attached to the conduit so as to replace the coin-operated locks.

BRIEF DESCRIPTION

Illustrative embodiments of the present invention are described in detail below with reference to the attached drawing figures, which are incorporated by reference herein and wherein.

DETAILED DESCRIPTION

Figure 1:
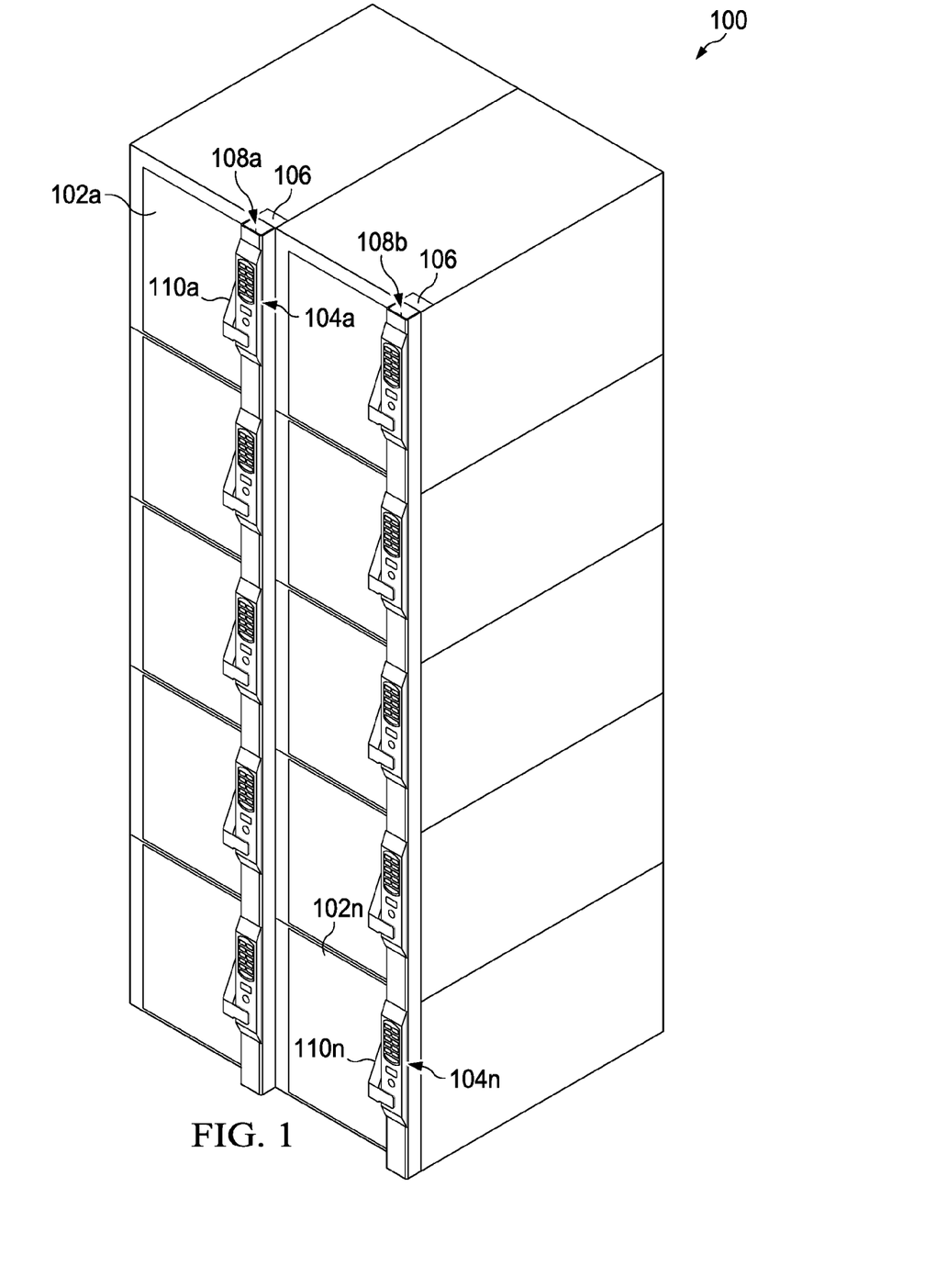
FIG. 1 is an illustration of an illustrative set of coin-operated lockers that have been retrofitted with electromechanical lock units in accordance with the principles of the present invention.

With regard to FIG. 1, an illustration of an illustrative set of coin-operated lockers 100 that have been retrofitted in accordance with the principles of the present invention is shown. The set of lockers 100 includes lockers 102a-102n (collectively 102) that are configured in two vertical columns. Each of the lockers 102 have been retrofitted with an electromechanical lock unit 104a-104n (collectively 104). The set of lockers 100 have vertical frame members 106 that are part of an original set of coin-operated lockers. In one embodiment, vertical wire channels or conduits 108a-108b (collectively 108) may be connected to the frame members 106 to provide for electrical conductors, such as wires and/or databus conductors, to be extended through the conduits 108. The conduits 108 may also serve as members onto which the electromechanical lock units 104 may be mounted. In one embodiment, the conduits 108 may be formed of stainless steel. Any other material may be utilized, as well. Although shown as single-piece conduits, multi-segment conduits, such as those shown in FIGS. 4-6, may alternatively be utilized to provide for easier field repairs of locks for individual lockers.

In mounting the electromechanical lock units 104 to the conduits 108, a manufacturer that is retrofitting the coin-operated lockers to replace the coin-operated mechanical locks with electromechanical lock units 104 may attach the electromechanical lock units 104 onto the conduits 108 (or segments of the conduits 108 if alternatively configured) prior to performing the retrofit of the coin-operated lockers 102, thereby saving time and cost in performing the retrofit. As shown, each of the electromechanical lock units 104 may have a handle 110a-110n (collectively 110) that are mounted to doors of each of the respective lockers 102. It should be understood that other components and configurations, such as horizontal conduits, wireless transceivers (if wireless communications are utilized), and other mechanical and/or electrical devices, may be utilized, as well, to accommodate for different configurations of sets of coin-operated lockers and environments of operation.

Figure 2A:
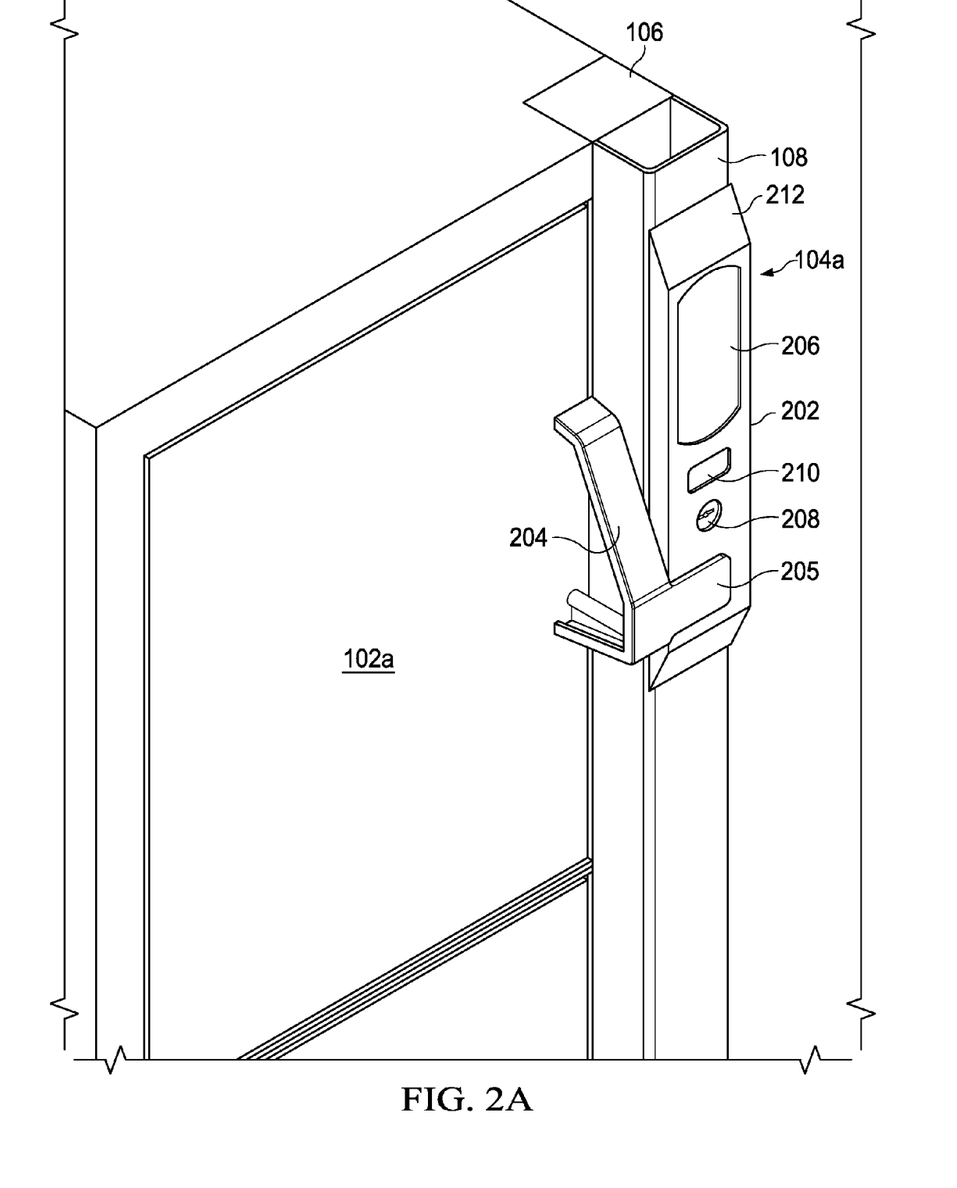
FIG. 2A is an illustration of an illustrative coin-operated locker that has been retrofitted with an electromechanical lock unit.

With regard to FIG. 2A, an illustration of locker 102a is shown. The locker 102a is shown to include frame member 106 that extends vertically alongside the locker 102a, and, onto which, conduit 108 is attached. The attachment may be performed in a variety of ways, including welding, using fastening members (e.g., nuts and bolts, screws, etc.), applying an adhesive, or otherwise, that avoids altering the existing frame member 106. In an alternative embodiment, the frame member 106 may be altered, but altering the existing frame member 106 may be more difficult than simply adapting a frame mount (see FIGS. 4-6) and/or other hardware due to having to make modifications to stainless steel. It should be understood that the conduit 108a may be attached in an alternative configuration or itself may have an alternative configuration while providing for the same or similar functionality as described herein. Still yet, the principles of the present invention may not include a conduit and simply have an alternative configuration of the electromechanical lock unit. Wiring would thereby likely have to pass through the lockers themselves, which is difficult, time consuming, and an unsecured way of retrofitting lockers, but still possible. As shown, the conduit 108a extends outward from the frame member 106 and extending adjacent to and forward with respect to the locker 102a. For the purposes of this description, the frame member 106 may be (i) a support structure of the set of lockers 100 onto which a face plate is mounted, (ii) a face plate that extends beside a set of locker doors, or (iii) or any other structural or non-structural member onto which the conduit may be attached.

The electromechanical lock unit 104a is shown to include a first portion 202 that includes electromechanical elements and a handle 204 that is attached to the door of the locker 102a. The electromechanical elements may include (i) a "brains" portion inclusive of logic circuitry, which may include a processing unit, communications circuitry, keypad and/or sensor, backup power supply (e.g., rechargeable battery), and other components used for operating and providing a user interface, and (ii) an electromechanical portion, such as a solenoid, screw drive, rotation drive, such as a motor, latch and/or other mechanism(s) configured to operate as a lock. The handle 204 in this embodiment may be secured to the door and have a striker member 205 that is attached to the handle 204 or that may be an integrated part of the handle 204. The striker member 205 may include an "eye" or other catch mechanism (not shown) that may be held securely by a latch or retention member of the first portion 202 of the electromechanical lock unit 104a when a door to which the handle 204 is attached is closed. The electromechanical lock unit 104a may further include a keypad 206 (see FIG. 2B). A keyhole 208 may be used by an operator to insert a key to manually override the electromechanical lock unit 104a to unlock the electromechanical lock unit 104a in the event of the electromechanical lock unit 104a has a problem opening. A push button 210 or other mechanism may be utilized to end a rental session by a user of the locker 102a.

The electromechanical lock unit 104a may be powered by an electrical conductor (not shown) extending through the conduit 108 and receive data communication via a databus (not shown) or wirelessly by a wireless communications databus. The electromechanical lock unit 104a may be configured to be controlled (i) remotely by a kiosk (see FIG. 3), (ii) by a computing device via a wide area network (e.g., the Internet), (iii) by a user interface mounted to the set of lockers (e.g., side or front panel (not shown)), or (iv) locally at the electromechanical lock unit 104a in the event that the electromechanical lock unit 104a is configured with the ability to receive and process payments through a credit card, near field communication (NFC), biometric reader, or otherwise. As shown, the striker 205 mates with a front portion of the electromechanical lock unit 104a when the locker 102a is in a closed position. The striker 205 may have an eye or other mechanical configuration to enable a latch to retain the striker 205. Alternatively, the striker 205 may be a metallic plate or other configuration and an electromagnet may be utilized to hold the locker door in place. Alternative configurations may be utilized in accordance with the principles of the present invention, such as placing the electromechanical portion of the lock on the door of the locker 102a and a stationary member without any electronics or moving parts on the conduit 108a.

Figure 2B:
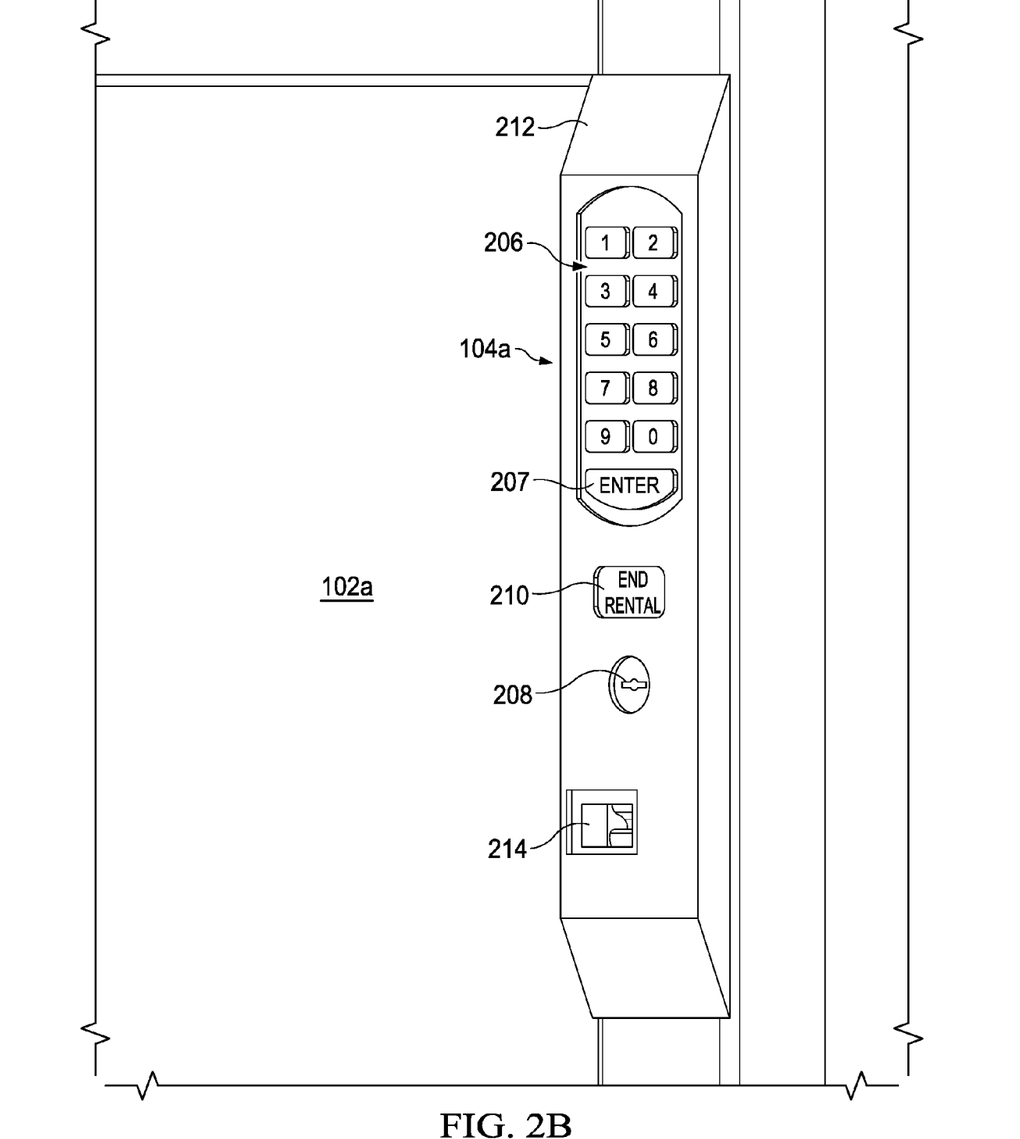
FIG. 2B is an illustration of another view of the electromechanical lock unit showing an illustrative keypad.

With regard to FIG. 2B, an illustration of another view of the electromechanical lock unit 104a is shown. An illustrative keypad 206 is shown to include numbers and an "enter" push-button 207 to submit a PIN or access code. Alternative submission mechanics may be utilized for indicating that the PIN is complete and ready for submission. Alternative configurations of a user interface may be utilized in accordance with the principles of the present invention, such as including a small touchscreen that uses a screen rather than physical push-buttons, as understood in the art. An "end rental" push-button 210 may enable a user who is currently renting the locker 102a to end his or her rental of the locker 102a.

The electromechanical lock unit 104a may be positioned on a housing 212 that includes a bezel that provides for both structural and ornamental design features. A latch 214 is shown to be accessible via an opening in the bezel housing 212, and aligned with a striker on the door of the locker 102a.

Figure 3:
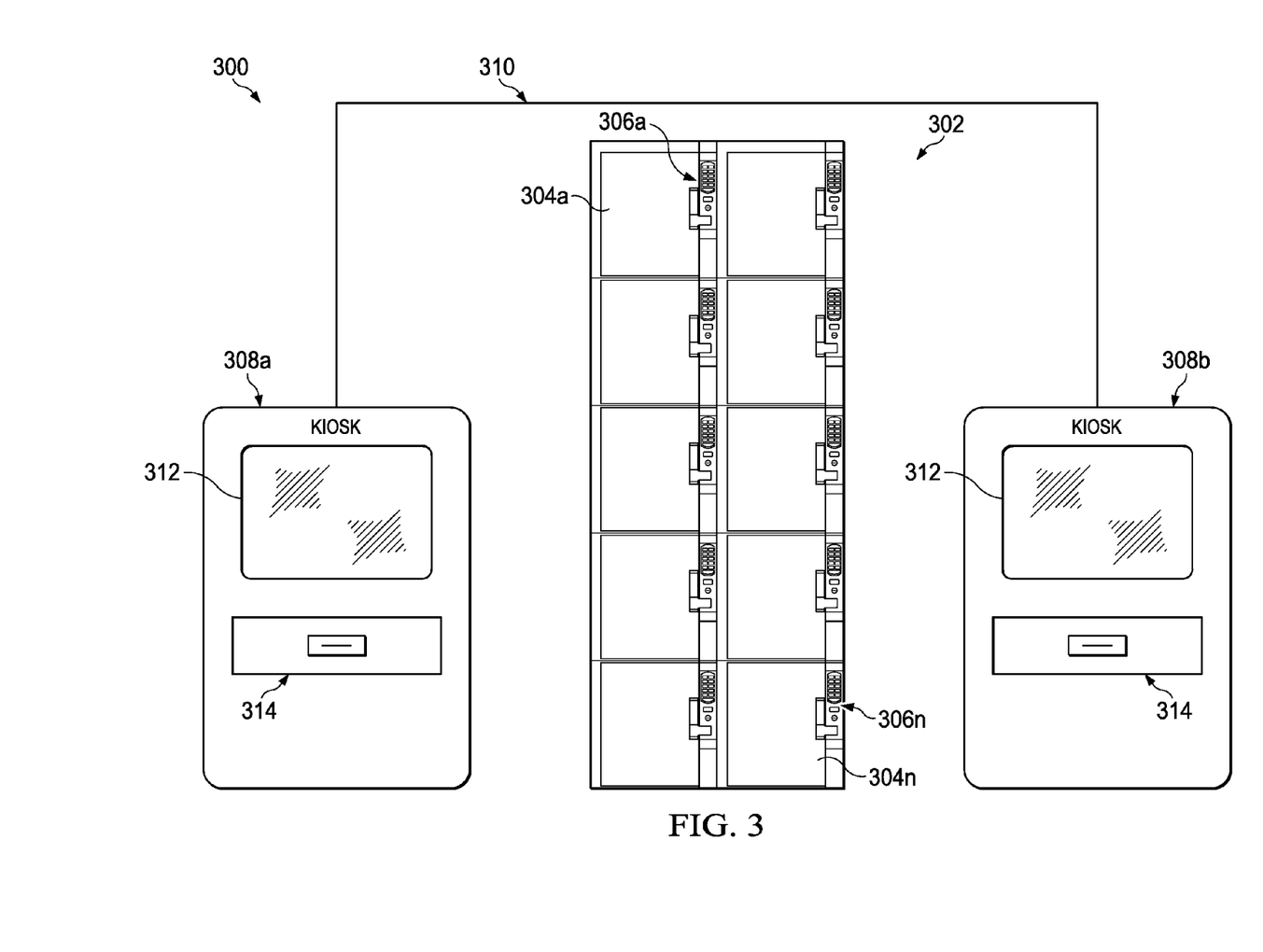
FIG. 3 is an illustration of an illustrative set of coin-operated lockers that have been retrofitted with electromechanical lock units in a network configuration in communication with multiple kiosks that may be used by users or renters to rent the lockers.

With regard to FIG. 3, a rental locker system 300 is shown to include a set of coin-operated lockers 302 that include lockers 304a-304n (collectively 304). Associated with each of the lockers 304 are electromechanical lock units 306a-306n (collectively 306) that have been used to replace the previously used coin locks. Each of the electromechanical lock units 306 may be operating in a network, where each of the electromechanical lock units 306 has a unique network address, as understood in the art. The locker system 300 may have one or more kiosks 308a and 308b (collectively 308) via which a user may rent a locker from the set of lockers 304. The kiosks 308 may be in communication with the electromechanical lock units 306 via a databus 310. The databus 310 may be a wired databus that may provide for serial or parallel communications between the kiosks 308 and each of the electromechanical lock units 306. In an alternative configuration, the databus may be a wireless databus that uses a wireless communications protocol to enable the kiosks 308 to communicate with the electromechanical lock units 306.

The kiosks 308 may include a touch screen 312, non-touch screen with push buttons, push buttons independent of a screen, or any other user interface, as understood in the art. Card and/or bill readers 314 may be included to enable a user to rent a locker using a credit card, debit card, prepaid card, and cash. Additional and/or alternative payment mechanisms may be incorporated into the kiosks 308, including a radio frequency identification (RFID), near field communications (NFC) reader to receive communications from a mobile device, or any other form of payment, such as a biometric reader, as understood in the art. As shown, the kiosks and electromechanical lock units, along with supporting hardware, may be used to retrofit coin-operated lockers, thereby preserving value of the lockers for the owners and operators, but providing additional value through the use of electromechanical lock units and kiosks, since such systems are easier to use, less prone to loss of keys, more trackable, easier to manage, and offer many other beneficial features for operators and users, as understood in the art. The rental locker system 300 may operate as further described in co-pending U.S. patent applicant Ser. No. 13/841,358 entitled "Autonomous Operations of Securable Devices," which is hereby incorporate by reference in its entirety.

Figure 4:
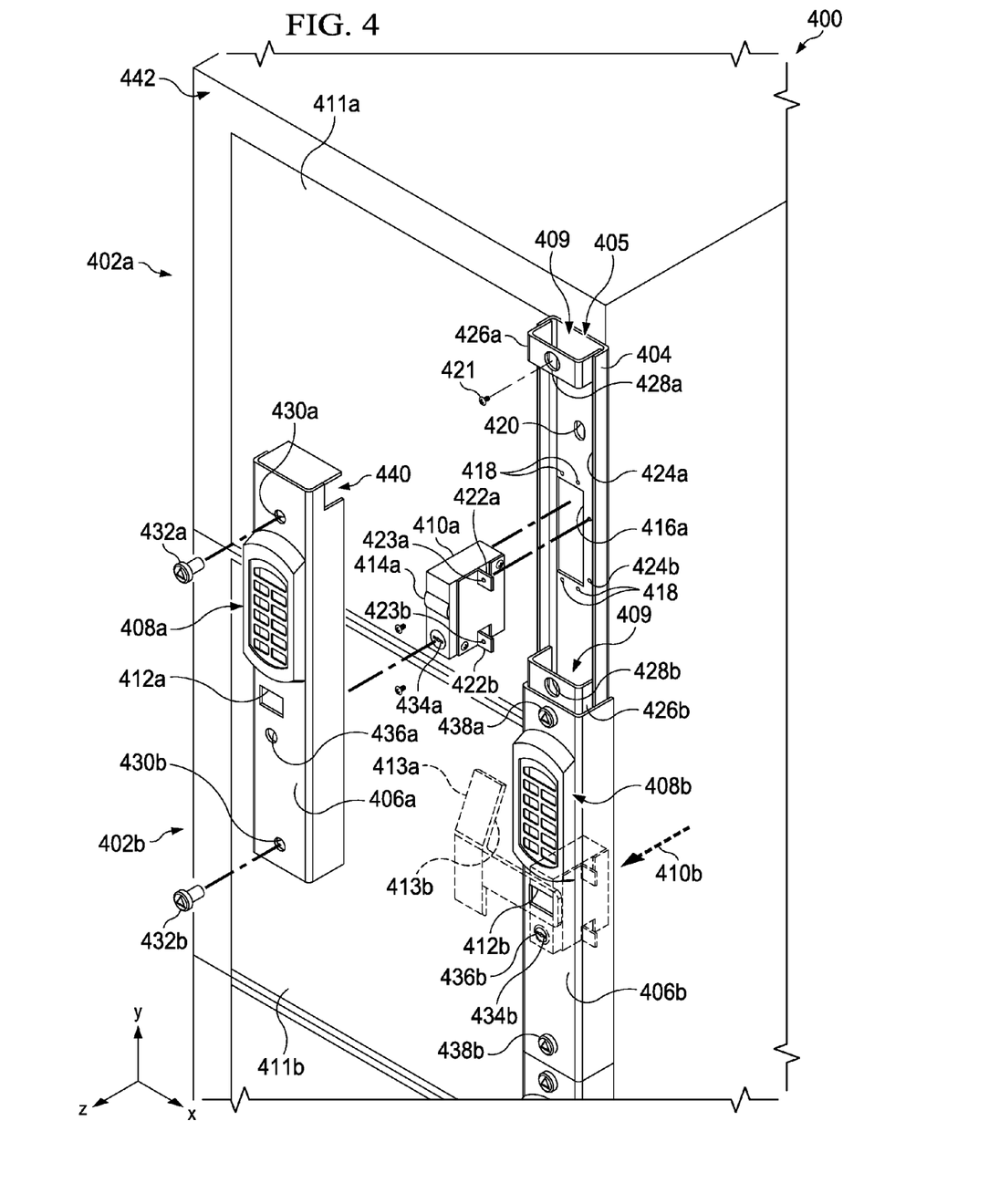
FIG. 4 is an illustration of an illustrative set of lockers that are being retrofitted with electronic locks in accordance with the principles of the present invention.

With regard to FIG. 4, an illustration of an illustrative set of lockers 400 that are being retrofitted with electronic locks in accordance with the principles of the present invention is shown. The set of lockers 400, which is a conventional set of coin-operated lockers, as previously described, may have multiple lockers 402a-402b (collectively 402). A frame interface or frame mount 404 may be configured to be engaged and retained by a vertical frame member 405. As understood in the art, the vertical frame member 405 may be configured with a channel slot (not shown) that previously supported coin-operated locks along with a channel for enabling coins to drop into a collection box (not shown) at the bottom of the vertical frame member 405 in accordance with the principles of the present invention. The frame mount 404 is configured such that no or little alteration of the vertical frame member 405 is needed to install the frame mount 404 when retrofitting the set of lockers 400, thereby providing simplicity and efficiency in the locker retrofitting process. Although the term "vertical" is used to describe the vertical frame member 405, the vertical frame member 405 may be positioned horizontally and in any other orientations in different types of lockers without limitation.

Front panels 406a and 406b (collectively 406) may be utilized to support keypads 408a and 408b (collectively 408) along a channel 409 between the frame mount 404 and front panels 406 through which wires (not shown) may extend to power and communicate signals to and from the keypads 408, for example. Lock units 410a and 410b (collectively 410) may be configured to be disposed within the channel 409, and operate to engage strikers (not shown) when locker doors 411a and 411b (collectively 411) are in a locked position using a latch (not shown) within the lock units 410. In that regard, receptacles or openings 412a and 412b (collectively 412) defined by front panels 406 of the lockers 402 may be provided. As a result, handle 413a and striker 413b may be configured to extend through opening 412b to be engaged when the locker door 411b of the lockers 402b is in a closed position. Latch openings 414a and 414b (collectively 414) defined by a housing of the lock units 410 may enable strikers (not shown) to extend therethrough to engage a latch (not shown) of the lock units 410. When fully configured, the latch openings 414 may be aligned with the openings 412 such that a striker is capable of extending through both the openings 412 and latch openings 414 when the lockers are locked.

Lock unit openings 416a and 416b (collectively 416) in the frame mount 404 may enable the lock units 410 to extend therethrough into a recess (not specifically shown) in the vertical frame member 405, where the recess was originally configured for coin-operated locks to be positioned. Holes 418 defined by the frame mount 404 may be configured to affix angled brackets (see FIG. 5) that are used to secure the frame mount 404 to the vertical frame member 405, as further described herein. Another opening 420, such as a through-hole, in the frame mount 404 may be aligned with a fastening aperature (not shown) in the vertical frame member 405 previously utilized for locking a coin-operated lock to the vertical frame member 405. In this case, the opening 420 may enable a fastening member 421, such as a screw or bolt, to secure the frame mount 404 to the vertical frame member 405.

The lock member 410a may have wing brackets 422a and 422b (collectively 422) to be attached thereto. The wing brackets 422 may include bracket openings 423a and 423b, and be aligned with lock unit security openings 424a and 424b (collectively 424) defined by the frame mount 404, thereby enabling the lock unit 410a to be secured to the frame mount 404.

Standoff brackets 426a and 426b (collectively 426) may be attached to or part of the frame mount 404. The standoff brackets 426 may respectively define standoff openings 428a and 428b (collectively 428). The front panel 406a may define openings 430a and 430b (collectively 430) that are aligned with the openings 428, thereby enabling fastening members 432a and 432b (collectively 432) to extend through the front panel 406a and openings 428 to secure the front panels 406 to the frame mount 404. The fastening members 432 may have heads with have a special "key" configuration that is proprietary or unconventional, thereby preventing someone from disassembling the front panel using an ordinary tool, such as a screw driver. That is, a special or proprietary screw driver with the special "key" configuration may be used to reduce the risk that an user will possess such a driver to attempt to access the lockers 402 in an unauthorized manner.

Key holes 434a and 434b (collectively 434) may be utilized by an operator to open or unlock the lock unit 410 in a manual manner in the event that the keypads 408 and/or lock units 410 malfunction. Access openings 436a and 436b (collectively 436) defined by the front panels 406 are aligned with the key holes 434, thereby enabling an operator to insert a key into the key holes 434 via the front panels 406 when the locker doors 411 are in an unlocked position as the keyholes 434 are not covered by strikers of the handles of the locker doors 411 when in locked positions. Fasteners 438a and 438b (collectively 438) may be utilized to secure the front panel 406b to standoffs (not shown) connected to the frame mount 404.

The front panel 406a may define a cutout 440 that allows conductors (not shown) to pass therethrough. The front panel 406a may have the cutout 440 on the right side of the front panel 406a if wires are to extend to the right, on the left side of the front panel 406a if the wires are to extend to the left of the front panel 406, or both the left and the right sides of the front panel 406a if the wires are to extend both to the left and to the right sides of the front panel 406a. Although not shown, a horizontal frame member 442 may have hardware, such as a frame mount (not shown) and front panel (not shown) that extend across the horizontal frame member to enable wires to extend from the front panel 406a and across the front of the horizontal frame member 442 in a concealed manner so that the wires may be extended along one or more other vertical frame member(s) to provide power and signaling to lock units associated with other lockers. Rather than extending in front of the horizontal frame member 442, the principles of the present invention may additionally and/or alternatively provide for a channel added to the set of lockers 400 across the top of the set of lockers 400.

Figure 5:
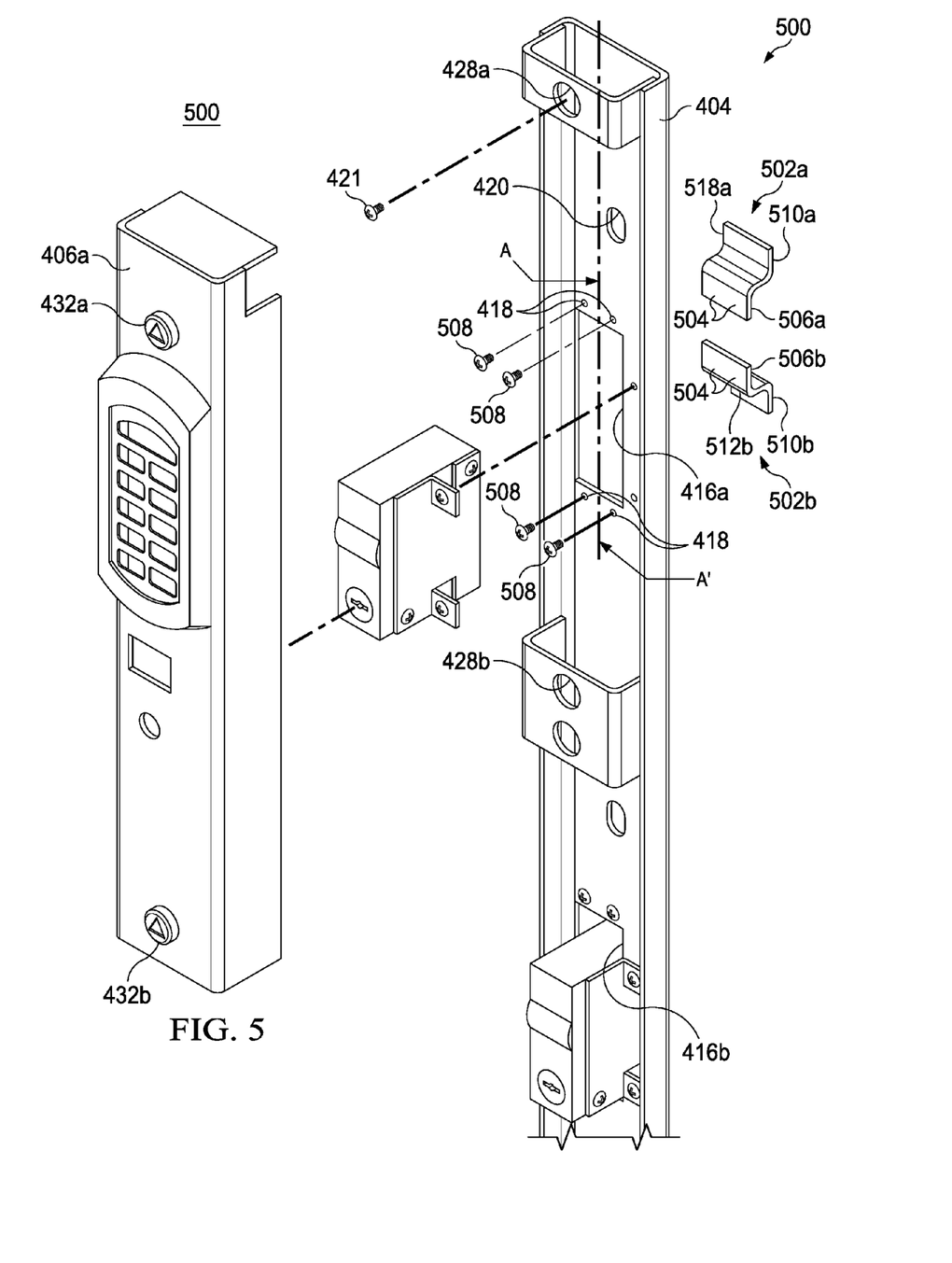
FIG. 5 is an illustration of an illustrative locker door retrofit assembly inclusive of the frame mount and front panel of FIG. 4.

With regard to FIG. 5, an illustration an illustrative locker door retrofit assembly 500 inclusive of the frame mount 404 and front panel 406a of FIG. 4 is shown. The frame mount 404 is provided to show how two angled brackets 502a and 502b (collectively 502) are to be attached to the frame mount 404. The angled brackets 502 define mounting apertures or openings 504 in mounting portions 506a and 506b, where the openings 504 are aligned with holes 418 defined by the frame mount 404. Fasteners 508, such as screws, may extend through holes 418 and openings 504 to secure the respective angled brackets 502a and 502b to the frame mount 404. Angled bracket 502a is to be aligned such that retention portions 510a and 510b respectively extend upwards and downwards. As a result of this configuration, shelf portions 512a and 512b of the angled brackets 502a and 502b respectively face upwards and downwards when affixed to the frame mount 404 by the fasteners 508.

Figure 6:
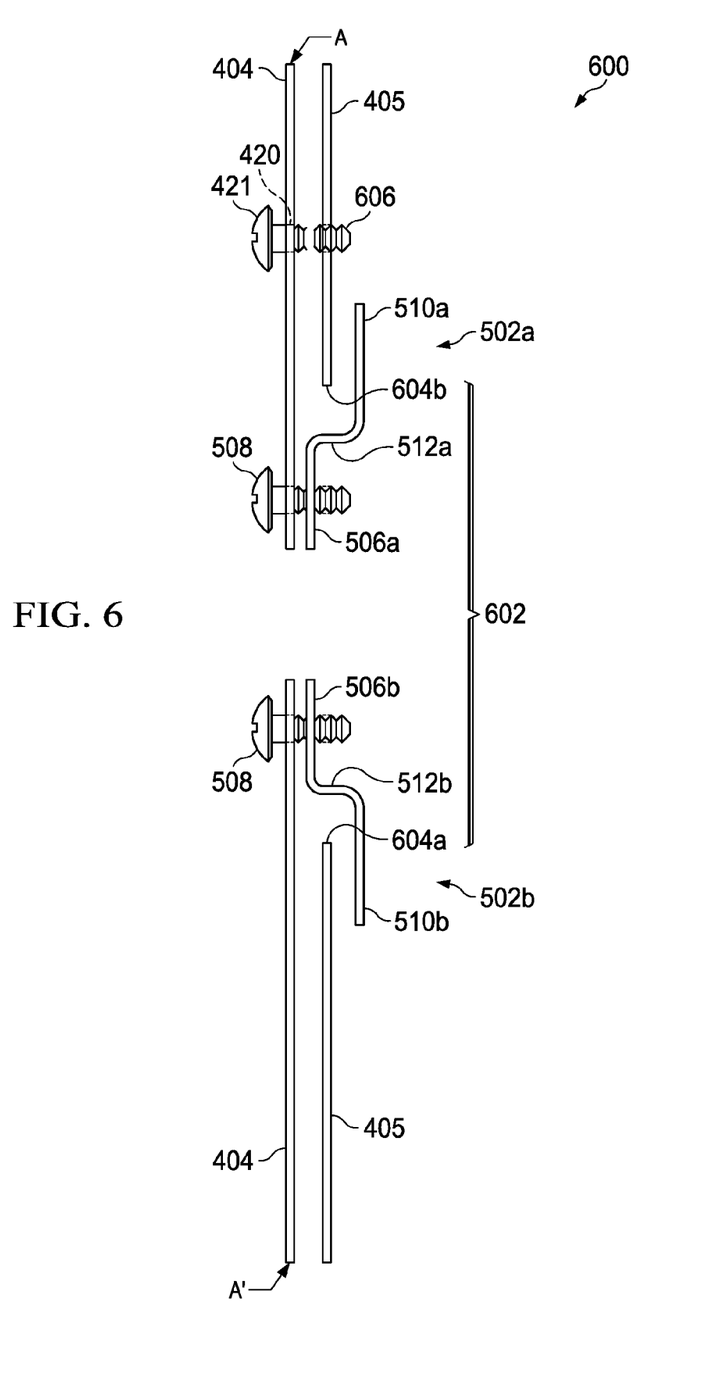
FIG. 6 is an illustration of a side view of an illustrative configuration of the frame mount being mounted to the vertical frame member.

With regard to FIG. 6, an illustration of a side view of an illustrative configuration of the frame mount 404 being mounted to the vertical frame member 405 is shown. The frame mount 404 may be mounted by using the angle brackets 502 and fastening member 421. In mounting the frame mount 404 to the vertical frame member 405, the angled bracket 502b may be connected to the frame mount 404 using fasteners 508. Because the frame mount 404, in one embodiment, extends the length of the vertical frame member 405, all of angled brackets to be positioned on the lower side of the openings 416 may be attached to the frame mount 404. Using angle bracket 502b as an example, the frame mount 404 may then be placed along the vertical frame member 405 such that angled bracket 502b may enter into a frame mount receptor or opening 602 defined by the vertical frame member 405. The frame mount 404 may be slid down such that the retention portion 510b slides past a top edge 604a of a bottom portion of the opening 602 until the shelf portion 512b rests on the top edge 604a (not precisely shown in that position). At that point, the angled bracket 502a may be affixed to the frame mount 404 by the fasteners 508 such that the retention portion 510a is on an opposite side of the vertical frame member 405 from the frame mount 404, thereby preventing the frame mount 404 from pulling away from the vertical frame member 405. Once the frame mount 404 is engaged with the vertical frame member 405, then the fastener 421 may be used to further secure the frame mount 404 with the vertical frame member 405 via opening 420 defined by the frame mount 404 and opening 606 defined by the vertical frame member 405, where opening 606 is universal with existing coin-operated lockers (at least with one major brand of coin-operated lockers).

The configuration of the set of lockers 400 presented in FIGS. 4-6 provides for (i) ease of retrofitting coin-operated lockers, (ii) ease of service or repair, and (iii) a high-degree of theft prevention. The ease of retrofitting coin-operated lockers is provided as a result of not having to drill or otherwise reconfigure the coin-operated lockers, which are typically made of stainless steel, because of the configuration and attachment process provided by the frame mount 404 and associated hardware (e.g., angled brackets). The ease of service or repair is provided by the front panels 406 being associated with a single locker 402a, such as front panel 406a being limited to locker 402a. As such, when a lock unit 410a needs to be repaired or serviced, a single front panel 406a may be removed without limiting usage of other lockers, such as locker 402b. The high-degree of theft prevention is provided by the frame mount 404 being secured to the vertical frame member 405 and the front panel 406a being secured to the frame mount 404 via fasteners 432 having a non-standard "key" configuration. And further, the opening 412a in the front panel 406a receiving the striker (not shown, but similar or the same as striker member 205 of FIG. 2A) when the locker is in a locked state, thereby capturing the front panel 406a between the handle of the locker door 411a and the lock unit 410a. In other words, the ability to disassemble the locker is limited, and the ability to unlock the locker is limited when the locker is in use.

Figure 7:
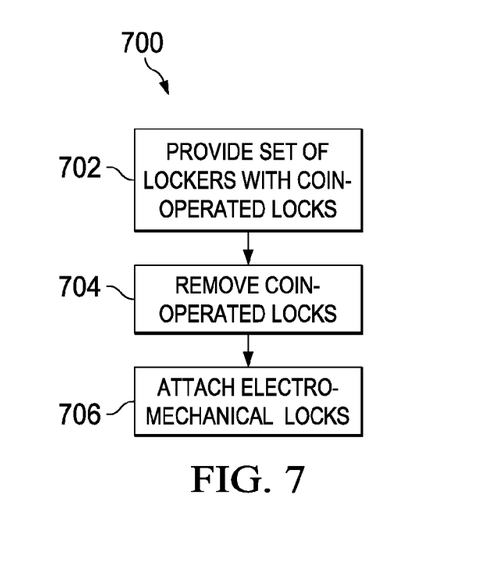
FIG. 7 is a flowchart of an illustrative process for retrofitting coin-operated lockers with electromechanical lock units.

With regard to FIG. 7, a flowchart of an illustrative process 700 for retrofitting coin-operated lockers is shown. The process 700 may start at step 702, where a set of lockers with coin-operated locks may be provided. In providing the set of lockers with coin-operated locks, the lockers may already exist at a site, such as an amusement park, or provided to a manufacturer at a manufacturing facility for retrofitting thereat. At step 704, the coin-operated locks may be removed from the lockers. At step 706, electromechanical lock units may be attached to the lockers. In attaching the electromechanical lock units, a conduit may be attached to a frame member of the set of lockers and the electromechanical locks may be attached to the conduit. In one embodiment, the electromechanical locks may be attached to the conduit prior to attaching the conduit to the frame member.

The electromechanical lock units may have two portions, a first portion that is attached to the conduit and a second portion that is attached to the respective doors of the lockers. The second portion may operate as a handle and a striker that engages with the first portion when the door of the respective handle is in a closed position to enable the first portion (i.e., electromechanical lock) to secure the door of the locker closed. In an alternative embodiment, the second portion of the electromechanical lock unit may be independent of a handle on the doors of the lockers. The first portion (electromechanical lock) of the electromechanical lock units may include logic circuitry for determining whether a user entering a PIN or other input is to cause the electromechanical lock unit to unlock or lock, communications circuitry to enable communications to a kiosk or other controller, rechargeable battery to enable the electromechanical lock units to operate in the event of a power failure, latch or other securing member to secure a door of a locker closed.

As previously described, rather than the electromechanical lock units being attached to the conduit, the "brains" portion of the electromechanical lock units may be attached to the doors of the lockers and the striker portion may be attached to or configured as part of the conduit. In such a configuration, batteries or inductive power transfer devices and rechargeable batteries may be utilized to power the electromechanical lock units. As an example, conduits may have inductive power supply members that are positioned at each electromechanical lock unit, which each have reciprocal inductive power supply members, thereby enabling the electromechanical lock units to be powered and rechargeable batteries on the electromechanical lock units to be recharged. In an alternative embodiment, rather than having a striker mounted to any of the handle, door, or frame, the electromechanical lock unit may have a retractable or rotatable member that extends in front of or otherwise prevents the door from being opened when the electromechanical lock unit is in a locked position and enables the door to open when in an unlocked position.

Moreover, a kiosk or other remotely located system may communicate an access code to the electromechanical lock units so that the electromechanical lock units may operate independent of the kiosk or other remotely located system. Each of the electromechanical lock units may have unique network addresses, such as IP addresses, to which the access code may be communicated. The kiosk may, therefore, communicate the access code in a broadcast manner (i.e., to each of the electromechanical lock units) or to particular electromechanical lock units, as understood in the art. In being remote, the kiosk or other computing system may be located over a communications network, either a local area network or wide area network. The kiosk or other computing system may be physically attached to a locker bank, physically independent of a locker bank, or located in a "cloud" configuration.

Figure 8:
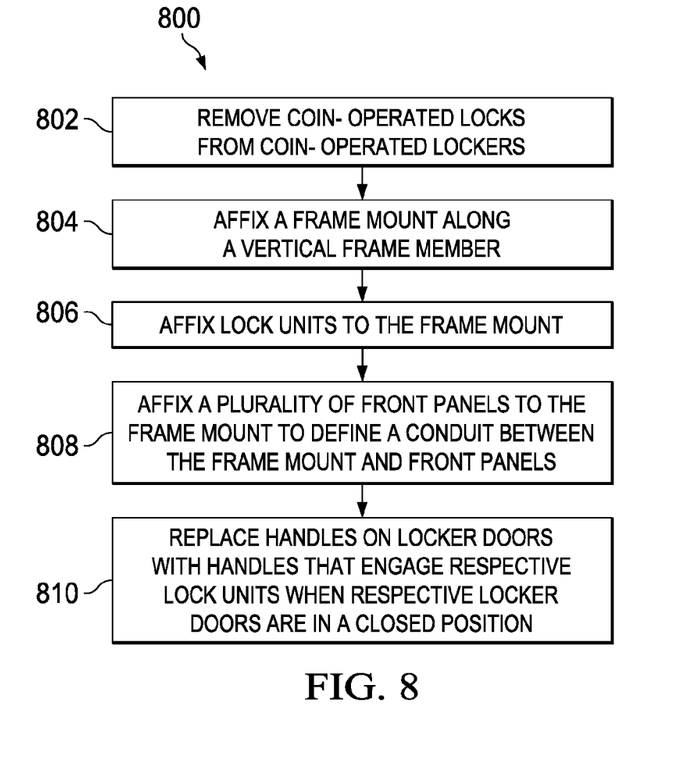
FIG. 8 is a flow diagram of an illustrative process for retrofitting coin-operated lockers with electromechanical lock units.

With regard to FIG. 8, a flow diagram of an illustrative process 800 for retrofitting an existing set of coin-operated lockers is shown. The process 800 may start at step 802, where coin-operated locks may be removed from the coin-operated lockers. At step 804, a frame mount may be affixed along a vertical frame member of the coin-operated lockers. In affixing the frame mount, mounting hardware that is adapted to secure the frame mount to the vertical frame member without an operator having to reconfigure the vertical frame member (e.g., drill into the vertical frame member) may be utilized. For example, (i) one or more first angled brackets may be attached to the frame mount, (ii) the frame mount may be positioned and preliminarily supported by the vertical frame member by the one or more first angled brackets engaging a first wall portion of the vertical frame member, (iii) one or more second angled brackets may be attached to the frame mount and engage a second wall portion of the vertical frame member to further secure the frame mount to the vertical frame member of the set of coin-operated lockers, and (iv) a fastener, such as a screw, may engage both the frame mount and the vertical frame member using a feature, such as a threaded opening in the vertical frame member, that already exists in the vertical frame member. This four-step process may allow the frame mount to be secured to the set of lockers without having to modify the set of lockers.

At step 806, lock units may be affixed to the frame mount. At step 808, a plurality of front panels may be affixed to the frame mount to define a conduit between the frame mount and front panels, where each of the front panels may be associated with a different locker. The front panels may include openings to enable a user interface (e.g., keypad) of the lock units to be accessible to a user for operation thereof as well as openings that enable the lock units to engage a portion of handles on doors of the lockers. At step 810, handles on the locker doors with handles that engage respective lock units when respective locker doors are in a closed position may be replaced. The handles may include strikers that extend through an opening into the lock unit for engaging a catch or other mechanism that prevent respective lockers from being opened when in a locked position. Moreover, when a locker is locked, the striker and lock unit are engaged so that the front panel is secured therebetween, and the lock unit is secured to the frame mount that is secured to the vertical frame member, thereby providing a secure assembly from the front panel to the frame of the set of lockers.

The previous description is of a preferred embodiment for implementing the invention, and the scope of the invention should not necessarily be limited by this description. The scope of the present invention is instead defined by the following claims.

What is claimed:

1. A method of manufacturing an electromechanical locker system, said method comprising:
providing a set of lockers including a plurality of lockers vertically aligned with one another, the lockers including coin-operated locks and a first conduit configured to enable coins to traverse vertically from coin payment slots associated with the vertically aligned coin-operated lockers;

detaching the coin-operated locks from the first conduit of the set of lockers;

attaching a plurality of first portions of electromechanical lock units onto a second conduit;

connecting the second conduit to a frame member at which the coin-operated locks had previously been positioned, the second conduit being positioned adjacent to and in front of the first conduit; and attaching a plurality of second portions of the electromagnetic lock units to doors of the vertically aligned lockers, the first and second portions of the electromechanical lock units being aligned with one another when the second conduit is attached to the frame member.

2. The method according to claim 1, wherein attaching the second portions of the electromechanical lock units includes attaching the second portion having a single member that includes both (i) a handle for a user to open and close respective locker doors and (ii) a striker for the respective electromechanical lock units to secure the respective doors shut.

3. The method according to claim 2, wherein attaching the first portion of an electromechanical lock units includes attaching the first portions to the second conduit prior to connecting the second conduit to the frame member, and wherein attaching the second portions of the electromechanical lock units to the doors of the vertically aligned lockers provides for the strikers to engage the respective first portions of the electromechanical lock units when the doors of the respective lockers are closed.

4. The method according to claim 3, wherein attaching the first portions of the electromechanical lock units includes attaching keypads for users to engage to submit access codes to cause the electromechanical lock units to unlock.

5. The method according to claim 1, further comprising:
extending at least one electrical conductor within the second conduit; and
connecting the at least one electrical conductor to the first portions of the electromechanical lock units attached to the second conduit to power the electromechanical lock units.

6. The method according to claim 5, further comprising communicatively coupling the at least one electrical conductor to a data communications device that operates to communicate data over the at least one electrical conductor to communicate an access code to the electromechanical lock units.

7. The method according to claim 6, further comprising providing a kiosk for a user to interface to rent a locker, the kiosk being in communication with the electromechanical lock units via the at least one electrical conductor.

8. The method according to claim 7, wherein providing a kiosk further comprises providing a kiosk that is physically independent from the set of lockers.

9. The method according to claim 1, further comprising assigning unique network addresses to each of the electromechanical lock units.

10. The method according to claim 1, wherein connecting a second conduit includes connecting multiple conduit segments to form the second conduit, and wherein attaching the first portions of the electromechanical lock units to the second conduit includes connecting the first portion of each electromechanical lock unit to each respective segment of the second conduit.

11. A retrofitted coin-operated locker bank, comprising:
a coin-operated locker bank including a plurality of vertically aligned lockers having respective hinged doors, the coin-operated locker bank being free of coin-operated locks;
a first conduit configured to enable coins to traverse vertically from previously positioned coin payment slots associated with the previously positioned coin-operated locks;
a second conduit connected to a frame member, the second conduit extending vertically and being (i) adjacent to the hinged doors of the vertically aligned lockers and (ii) adjacent to and in front of said first conduit;
a plurality of first portions of electromechanical lock units affixed to said second conduit; and
a plurality of second portions of electromechanical lock units attached to the hinged doors of the vertically aligned lockers.

12. The retrofitted coin-operated locker bank according to claim 11, wherein each of the second portions include a handle, and is configured to contact respective first portions of the electromechanical lock units connected to said second conduit when the hinged doors are in a closed position.

13. The retrofitted coin-operated locker bank according to claim 12, wherein the handles include a striker, the striker extending through a front face of the respective first portions of the electromechanical lock units connected to said second conduit when the hinged doors are in the closed position.

14. The retrofitted coin-operated locker bank according to claim 11, further comprising at least one electrical conductor extending through said second conduit, and being electrically connected to said first portions of the electromechanical lock units connected to said second conduit.

15. The retrofitted coin-operated locker bank according to claim 14, further comprising a kiosk in electrical communication with said at least one electrical conductor, and configured to enable a user to rent a locker from the plurality of vertically aligned lockers.

16. The retrofitted coin-operated locker bank according to claim 11, wherein the electromechanical lock units are configured on a communications network, each of the electromechanical lock units having a unique network address.

17. The retrofitted coin-operated locker bank according to claim 11, wherein the electromechanical lock units include a mechanism that, when operated by a renter, causes rental of an associated locker to end for the renter.

18. The retrofitted coin-operated locker bank according to claim 11, further comprising at least one kiosk being remotely located from a housing of said coin-operated locker bank.

19. The retrofitted coin-operated locker bank according to claim 11, wherein said second conduit extends outward from said coin-operated locker bank, and wherein said first portions of the electromechanical lock units are mounted to be parallel to the doors of the lockers such that said second portions of the electromechanical lock units engage said respective first portions of the electromechanical lock units.

20. The retrofitted coin-operated locker bank according to claim 11, wherein said second conduit includes:
a first member that extends along and is secured to a vertical frame member of the locker bank; and
a plurality of second members that are respectively positioned in association with lockers along the vertical frame member, wherein said first member and said plurality of second members define a passageway of said second conduit within which electrical conductors are extendible.

\* \* \* \* \*